June 25, 1946.　　　M. A. SHRIRO ET AL　　　2,402,682
MOUNTING DEVICE
Filed Feb. 11, 1944
FIG. 1.
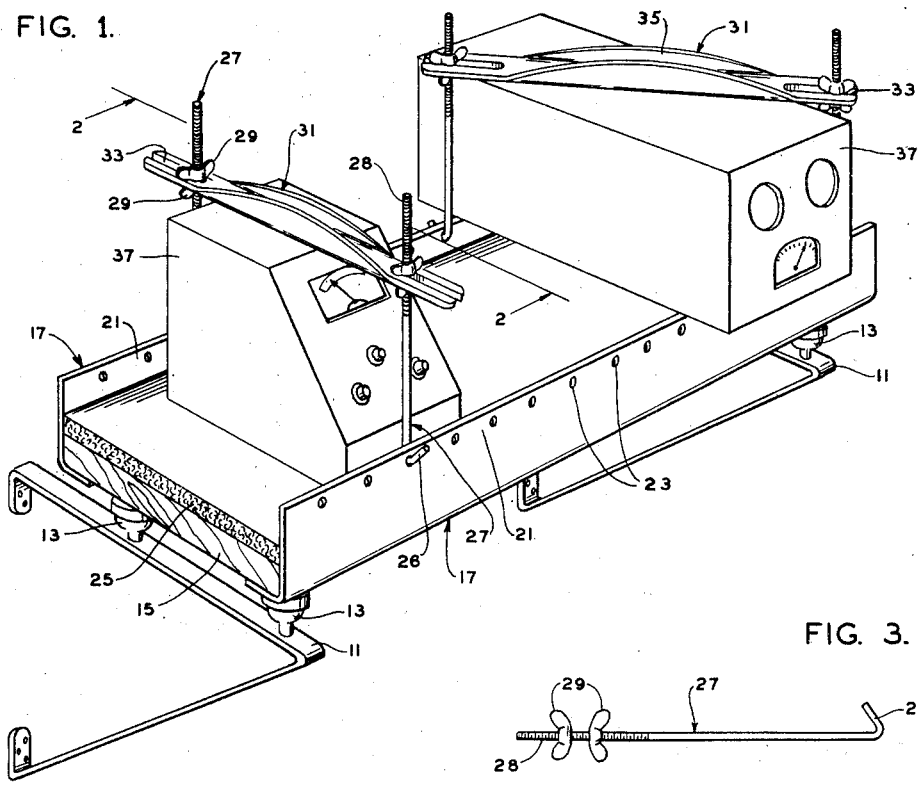
FIG. 2.
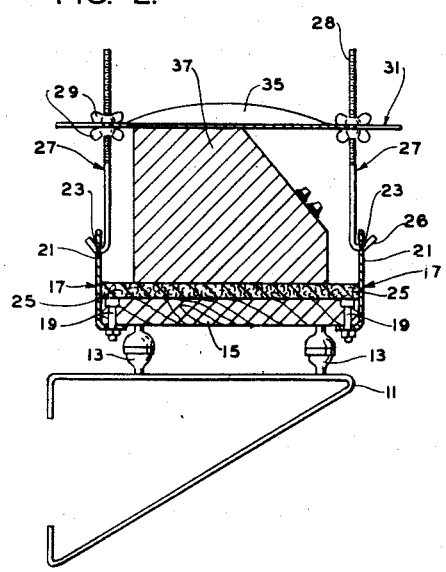
FIG. 3.
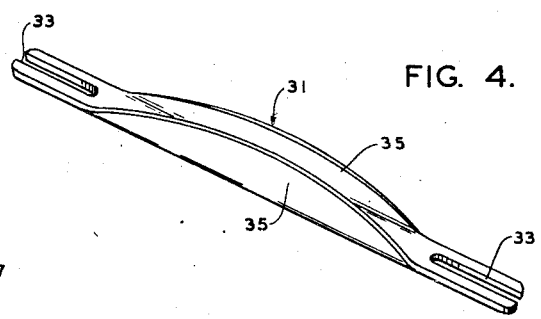
FIG. 4.
INVENTORS.
MORRIS A. SHRIRO
ALEXANDER HINDIN
BY
William D. Hall.
ATTORNEY.

Patented June 25, 1946

2,402,682

UNITED STATES PATENT OFFICE 2,402,682

MOUNTING DEVICE

Morris A. Shriro, Elberon, and Alexander Hindin, Eatontown, N. J., assignors to the Government of the United States of America, as represented by the Secretary of War Application February 11, 1944, Serial No. 521,962

3 Claims. (Cl. 248—361)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in mounting devices.

It has been found that in maintaining, testing and servicing radio and other electronic equipment it frequently becomes necessary to transport pieces of equipment, parts, sensitive calibrating apparatus, and other objects, from one place to another, in mobile vehicles.

Experience has shown that, if not suitably mounted in such vehicles, these objects will shift, fall over, suffer injury due to vibration and shock and at times may even be lost. It is, therefore, an object of the present invention to provide a mounting device which will securely sustain such equipment and objects so as to keep them in place and at the same time protect them from injury from undue vibrations.

The equipment and other objects, which may be transported, are of different sizes and shapes. We have, therefore, designed a device which is adapted to securely hold any of these various objects.

As the various pieces of equipment carried may have to be mounted and dismounted with considerable frequency, it is another object of our invention to provide a device which is simple and which will allow rapid mounting and removal of the objects and which will not require the use of any tools.

At times it may be convenient to use or test some of the equipment without removing it from the vehicle. In such instances the controls and indicators of the equipment and apparatus should be free so that they will be visible and may be manipulated, while the equipment is securely mounted in the device. Also, under such circumstances, equipment of different sizes and shapes may have to be positioned side by side. Hence, it is a further object of our present invention to provide means whereby such objects may be suitably secured in close proximity to each other, irrespective of their sizes and shapes.

Although we have shown in the drawing and will describe herein an embodiment of our invention especially suitable for the transportation of electronic equipment in a vehicle, obviously it may have numerous other uses.

Other objects and uses will become apparent from the following description of our device and the appended drawing.

In the drawing:

Figure 1 is a perspective view of one embodiment of our device showing several pieces of equipment in position thereon;

Figure 2 is a transverse section, along the line 2—2 of Figure 1;

Figure 3 is a perspective view of one of the hook rods of said device; and,

Figure 4 is a perspective view of one of the yokes.

Our device may be secured to a wall of a vehicle by means of two or more brackets 11, of the triangular type shown in the drawing or any other suitable mounting brackets. Sustained upon said brackets 11 by any suitable vibration absorbing mounts 13 is a shelf 15 of wood or other suitable material. Strips of angle metal 17 extend along the front and rear edges of the shelf 15, said angle metal 17 being secured to the shelf by a number of through bolts 19. Said strips of angle metal 17 form upwardly extending flanges 21 at the front and rear of the shelf 15. Each flange 21 is successively pierced by a plurality of holes 23. The shelf 15 may be covered by a layer of heavy felt 25 or other suitable material.

Our device is also provided with a plurality of hook rods 27 of different lengths. Each of said hook rods 27 comprises a metal rod, bent over into a hook 26 at one end and threaded for a considerable portion of its length at the other end 28. The threaded end 28 of each hook rod 27 is provided with a pair of butterfly nuts 29, facing each other.

There are also provided a plurality of yokes 31 of different lengths, each yoke having a longitudinally disposed slot 33 at each end. For added strength, each yoke 31 has two upwardly extending flanges 35 which run longitudinally along said yokes intermediate the slotted ends thereof.

To use our device a meter or other object 37 to be secured is placed upon the felt pad 25, a yoke 31 is placed across said object, the hooks 26 of a pair of hook rods 27, of suitable length for the particular object, are hooked into holes 23 in the front and rear flanges 21 and the threaded ends 28 thereof are slipped into the slots 33 so that one butterfly nut 29 of each hook rod is above the yoke and the other is below it. The upper nuts 29 are then tightened down until the object 37 is firmly secured. The lower nuts 29 may then be tightened up to act as lock nuts. Large pieces of equipment may be secured by two or more yokes 31 and their associated hook rods 27.

On occasion it may be desirable to secure a piece of equipment which is too large to fit between the flanges 21. In that event it may be placed above the flanges 21 and secured with a longer yoke 31, disposed at an angle as shown to the right in Figure 1. The yokes 31 and hook rods 27 may be so positioned as to leave dials, meter windows or other parts of the apparatus free for use while they are still securely retained by our device, thus, making it possible to use the equipment without removing it from the shelf.

We claim:

1. A mounting device comprising a horizontally disposed elongated shelf; two horizontally elongated strips of angle material secured to said shelf and extending under the front and rear edges of said shelf and vertically upward from said front and rear edges, the vertical portions thereof being successively pierced above the level of the shelf by a horizontal row of apertures; two hook rods, provided at one end with a hook, hookable into the apertures aforesaid, and being externally threaded at the other; two butterfly nuts threaded upon each of said hook rods; a yoke, slotted at each end to receive a hook rod; said yoke being positionable relative to the shelf and secured to the rods by the butterfly nuts.

2. A mounting device comprising a horizontal shelf, two horizontally elongated upwardly directed flanges extending lengthwise along the front and rear respectively of said shelf, said flanges being pierced by a succession of holes substantially horizontally positioned relative to each other, two hook rods, each such rod having a hook at one end, hookable into the holes aforesaid, and being threaded at the other end and being provided with a pair of wing nuts, a yoke slotted at each end to receive one of said hook rods.

3. A mounting device adapted to sustain and grip objects of different sizes and shapes, comprising an elongated shelf; means to sustain said shelf, two horizontally elongated strips of angle material, disposed respectively along the front and rear edges of said shelf; each of said strips including a horizontally elongated, horizontally disposed, flange extending below one edge portion of said shelf, and a horizontally elongated flange extending upwardly from the said edge of said shelf; fastening means securing the horizontally disposed flange to the shelf; a plurality of holes, in a horizontal row, along each of said upwardly extending flanges and above the level of said shelf; a plurality of hook rods, each of said rods including a hook at one end adapted to hook into any one of the holes aforesaid, and a screw threaded portion at the other end; a nut threaded upon the said screw threaded portion of each of said hook rods; a yoke provided with a longitudinally disposed slot at each end, each of said slots being receivable to the threaded portion of one of the rods aforementioned; so that a pair of said hook rods may be disposed vertically, with their hooks hooked into holes in said upwardly extending flanges, on opposite sides of said shelf, either directly or indirectly opposite each other, and a yoke may be horizontally disposed above said shelf, the threaded portions of the two hook rods aforementioned extending through the slots therein, the nuts on said rods being positioned above the yoke, so that the distance between the shelf and the yoke may be varied by means of the nuts and the distance between the rods may be varied by hooking them into holes which are different distances apart and by sliding the rods horizontally along the slots in the yoke aforesaid, so that objects of different sizes and shapes may be gripped either between the shelf and the yoke or between the upper edges of the upwardly extending flanges and the yoke.

MORRIS A. SHRIRO.
ALEXANDER HINDIN.